E. L. GAYLORD,

Assignor to THE EAGLE LOCK COMPANY.

Piano-Lock.

No. 8,850. Reissued Aug. 12, 1879.

Witnesses.

W. B. Thomson

S. S. Burr

Inventor.

Edward L. Gaylord

By James Shepard Atty.

N. PETERS, PHOTO-LITHOGRAPHER, WASHINGTON, D. C.

UNITED STATES PATENT OFFICE.

EDWARD L. GAYLORD, OF BRIDGEPORT, ASSIGNOR TO THE EAGLE LOCK COMPANY, OF TERRYVILLE, CONNECTICUT.

IMPROVEMENT IN PIANO-LOCKS.

Specification forming part of Letters Patent No. 68,497, dated September 3, 1867; Reissue No. 8,850, dated August 12, 1879; application filed May 26, 1879.

*To all whom it may concern:*

Be it known that I, EDWARD L. GAYLORD, formerly of Terryville, in the county of Litchfield and State of Connecticut, now of Bridgeport, in the county of Fairfield, said State, have invented a new and Improved Lock; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved lock of that class which is designed for articles having hinged lids—such, for instance, as piano-fortes, sewing-machines, &c.

The invention consists in a novel means employed for operating the bolts of the lock, as hereinafter fully shown and described; also, in the combination of a lock-bolt and a single spring set with one of its ends bearing against a point of the bolt, and operating upon that point to throw the bolt both forward and backward after being started, as hereinafter more fully described.

Figure 1:
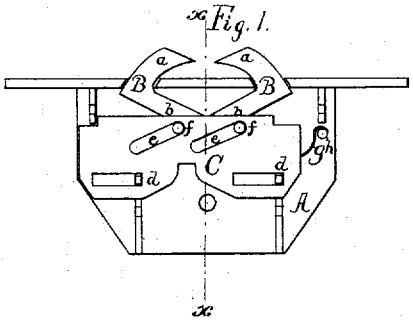
Figure 2:
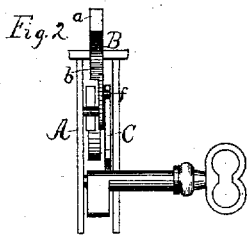
Figure 3:
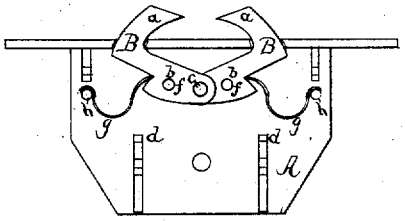
Figure 4:
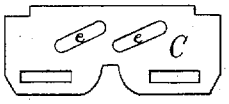
Figure 5:
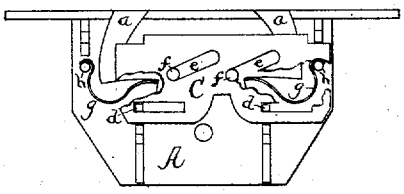

In the accompanying sheet of drawings, Figure 1 is an internal view of a lock constructed according to my invention; Fig. 2, a section of the same, taken on the line *x x*, Fig. 1. Fig. 3 is a view similar to that shown in Fig. 1, but with the slide removed, in order to better show the bolts and their springs, the same being represented with the bolts in a locked position. Fig. 4 is a plan view of the slide detached; and Fig. 5 is an internal view of said lock, representing the bolts unlocked, the slide being partially broken away in order to better show the other parts.

Similar letters of reference indicate like parts.

A represents the case of the lock, which may be constructed in the usual or any proper manner, and B B are the two bolts of the lock, the outer parts, *a*, of which are of curved form, and the inner parts, *b*, are straight, projecting at about right angles from the parts *a*. The inner ends of the parts *b* are fitted on one and the same pivot *c*, although they may work on separate pivots, if desired.

C represents a slide, which moves horizontally in the lock-case and works on suitable guides *d*. This slide is provided with two oblique slots, *e e*, which are parallel with each other, and in which pins *f f*, attached to the parts *b* of the bolts, pass. Each bolt has a spring, *g*, bearing upon it, as hereinafter more fully described.

The slide C is moved by means of a key, and it will be seen that when the slide is moved to the right the bolts B B will be drawn down and the lock unlocked, the springs *g g* being depressed as the bolts are started down, and by moving the slide in the opposite direction, to the left, the bolts B B will be forced upward, and the curved parts *a* pass through holes in a plate which is attached to the lid of the article to which the lock is applied. Each spring is so combined with its bolt that one end of the spring bears against a particular point of the bolt, and rests in a little depression or notch to prevent accidental displacement. The other end of the spring bears against a proper support on the case, represented in the drawing as a post or pin, *h*, whereby the body of the spring can oscillate as on a fulcrum or pivot, and the end which engages the bolt always operates upon the one particular point of engagement without any of the wiping or scraping action of springs which act alternately upon different points, as in Patent No. 47,349, which is hereby disclaimed.

It should be noticed that the bolts and springs are relatively so located that when the bolts are thrown outward or into a locked position, as represented in Figs. 1, 2, and 3, the point of contact with the spring is on one side of the fulcrum of the bolt, so that said spring bears upon the bolt to force it outward and to hold it out or forward, and that when the bolts are unlocked, as shown in Fig. 5, the point of contact with the spring is on the opposite side of the fulcrum of the bolt, whereby said spring bears upon the bolt to force it inward or backward and hold it in, by which construction and combination a single spring acts upon each bolt to move with it and force it both forward and backward so soon as it has been started by any proper means, as by the key, through the slide, and moved far enough to carry the point of contact with the spring to either side of the fulcrum of the bolt. The springs *g g* not only facilitate the outward or forward movement of the bolts, but also continually bear upon them to hold them out when locked, and prevent any loose play or rattling of the same.

I hereby disclaim all combinations of a lock-bolt and spring in which the side of the spring bears upon the bolt and has a wiping action thereon.

Having thus described my invention, I claim as new and desire to secure by Letters Patent—

1. The two bolts B B, arranged so as to work on a single pivot or center, *c*, in combination with a horizontally-moving slide connected with the bolts, as shown, and all arranged to operate in the manner substantially as and for the purpose set forth.

2. The combination of a lock-bolt and a single spring set with one of its ends bearing against a point of the bolt, and operating upon that point to force the bolt both forward and backward after being started, substantially as described, and for the purpose specified.

EDWARD L. GAYLORD.

Witnesses:

FREDERICK S. STEVENS,
THOS. R. CRITTENDEN.